Patented Dec. 9, 1930

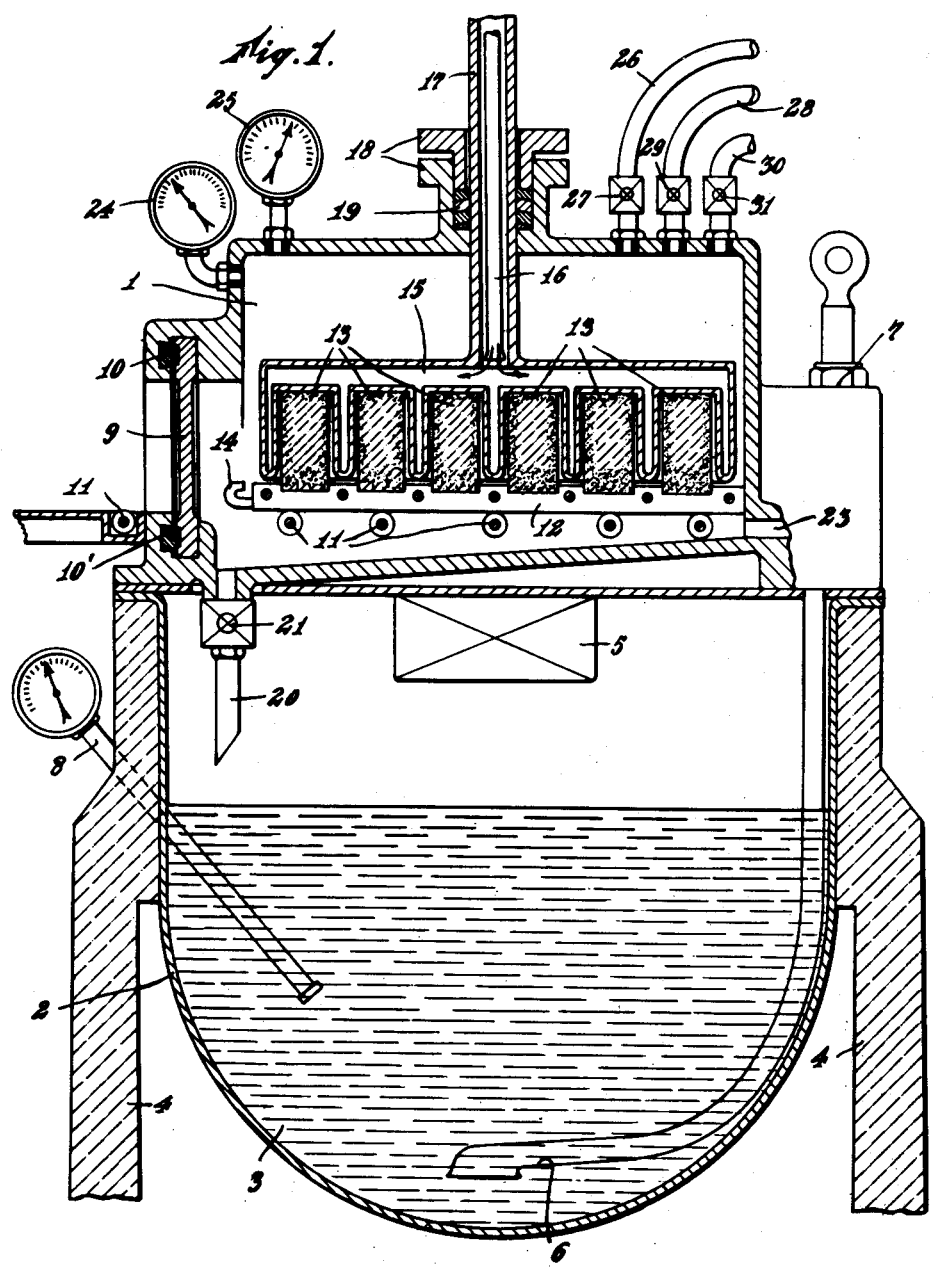

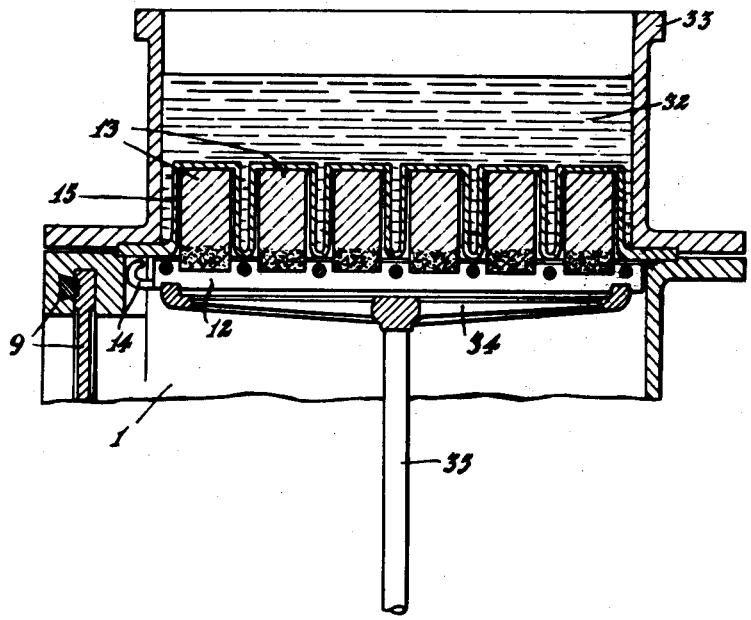
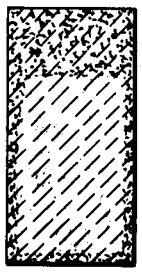
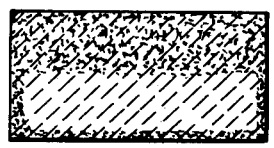

1,784,164

UNITED STATES PATENT OFFICE

ANDREAS JOHANNES MARIA STOFFELS AND HERMAN TOBIAS VAN DER WISSEL, OF THE HAGUE, NETHERLANDS

PROCESS FOR IMPREGNATING BRICKS AND LIKE MATERIALS

Application filed August 25, 1927, Serial No. 215,498, and in the Netherlands December 31, 1926.

Our invention has for its object an improved process for impregnating bricks and like material particularly bricks for road surfacing under great economization of impregnating medium and a device for performing said process.

Our invention consists in impregnating the different sides of said material in preheated condition to a different extent under pressure, by cooling the impregnating medium consisting of a thermo-plastic material in the impregnating chamber at those sides of the material, where a less intensive impregnation is desired.

Further, according to our invention the pressure in the impregnating chamber may be reduced after the impregnation has taken place by which means an excess of the impregnating medium is driven out which may be returned into the vessel containing said medium. A further feature of our invention is to obtain a further economization of impregnating medium by transferring the impregnated material either directly after its impregnation or after the bulk of said medium has already been removed from the material in the impregnating chamber in the above described manner, into a separate heated chamber. The pressure in said chamber may also be reduced, after the material has been transferred thereto, beneath the atmospheric pressure which causes a further quantity of the impregnating medium to be regained or driven out respectively.

The invention may also be carried out by submitting the preheated material prior to the impregnation to a pressure higher than the atmospheric pressure and subsequently impregnating it under a further raised pressure. In this way not only an excess of impregnating medium will be driven out when the pressure in the impregnating chamber is reduced but also a further advantage is obtained as the product will be more uniformly impregnated at its different sides. In this manner the penetration of the impregnating medium in more porous material or in the more porous parts of the same material is slackened, so that less porous material or the less porous parts of the same material may be exposed for a sufficient period of time to the impregnating pressure, without the more porous material or more porous parts of the same material being impregnated to a too large extent. In this way the impregnation is regulated generally.

Now to further elucidate the above described process a suitable device for carrying out the same is represented in the drawing, in which:

Fig. 1 is a central longitudinal sectional view of an impregnating chamber, arranged directly above the tank containing the impregnating medium.

Fig. 2 is a central longitudinal sectional view of another construction of the impregnating chamber.

Figs. 3 and 4 are longitudinal and traverse sectional views respectively of bricks for pavement purposes impregnated according to the invention.

The impregnating chamber 1 is illustrated as being of rectangular form mounted directly above the tank 2 containing the impregnating medium 3 which is surrounded by the walls 4 of the furnace (not shown). The tank 2 is equipped with a normally covered manhole 5, for the introduction of the charge, a draw-off pipe 6 which reaches near to the bottom of the tank 2 connected to a pump 7, and a thermometer 8.

The impregnating chamber 1 is equipped with a slide valve 9 with packings 10, 10', rollers 11 for supporting the support or grate 12 upon which the bricks 13 are placed, which grate 12 is provided with a hook 14, a cooling jacket 15, with inlet pipe 16 and outlet pipe 17 for the cooling medium the latter pipe supporting the cooling jacket 15 and closely fitting in a packing gland 18 forming part of the top plate of the impregnating chamber 1, with packing 19. The impregnating chamber 1 is further provided with a draw-off pipe 20, controlled by valve 21, an inlet 23, connected with the pressure piping of the pump 7, a manometer 24, a vacuum gauge 25, a vent pipe 26, controlled by a valve 27, a pressure pipe 28, controlled by a valve 29 and a vacuum pipe 30, controlled by a valve 31.

According to the construction illustrated in Fig. 2 of the drawings instead of moving the cooling jacket downwardly over the bricks the grate 12 with the bricks 13 is moved upwardly by means of the moving table 34 with guide rod 35 in the fixed cooling jacket 15 which is cooled by means of a cooling medium 32, circulating in the cooling tank 33.

As an example of the practice of the improved method embodying the present invention an impregnating medium e. g. bitumen, may be placed in the tank 2 and liquefied by heating it at the proper temperature which temperature is approximately maintained. Also a solvent may be added to the bitumen to considerably reduce its melting point so that after solution it may be applied either in cooled condition or at any desired lower temperature than that of the molten bitumen.

The bricks to be impregnated are preferably, after their absorbtive power has been increased in the above described manner, heated to a higher temperature than the temperature of the impregnating medium (bitumen, tar, asphalt solution or the like) which preheating is already known in the art and subsequently placed upon the grate 12 which then is introduced together with the bricks 13 by means of the rollers 11 in the impregnating chamber 1. Thereafter the impregnating chamber 1 is closed by means of the slide valve 9 and the cooling jacket 15 lowered over the bricks.

According to Fig. 2 of the drawings, as already mentioned, the cooling jacket 15 is fixedly arranged in a water containing tank 33, and the grate 12 together with the bricks 13 and the table 34 are moved upwardly by means of the guide rod 35 into the cooling jacket.

Subsequently the pressure of the air or of some other suitable gas or vapour (e. g. steam) in the impregnating chamber may be raised, and consequently also the pressure in the pores of the bricks, by pressing gas or vapour through pipe 28 (Fig. 1) (valve 29 being opened) into the impregnating chamber which is however not necessary, and the impregnating medium is pressed into the impregnating vessel 1 through tube 23 by means of the press pump 7, the valves 21, 27, 29, 31 being closed.

The bricks are now surrounded by the impregnating medium and the latter penetrates into the pores of the bricks, the pressure in the impregnating chamber being further raised.

The amount of the pressure under which the impregnating medium is pressed into the impregnating chamber may be regulated by means of the controlling valve 21.

At the sides of the material where the bitumen passes into a thick-liquid condition by its contact with the cooling jacket, the resistance against penetration in the brick is increased in such a way that the impregnation can only take place to a small extent. It may be regulated by the amount of cooling.

At the sides where the cooling jacket does not cover the brick the bitumen remains in a thin liquid condition and for this reason it may penetrate in the brick to a larger extent.

If the pressure in the impregnating chamber 1 has already been raised previously to the impregnation proper it is further raised by pressing the bitumen in the impregnating chamber. After the impregnation has taken place the pressure in the impregnating chamber is reduced by opening the vent-valve 27 in pipe 26 and the compressed gas in the bricks will partially drive out the bitumen which has been pressed into the bricks. The amount of this quantity may be regulated by the amount of pressure applied before and during the impregnation of the material.

This quantity of bitumen flows back through valve 21, which also has been opened, and pipe 20 into the bitumen tank 2. A further quantity of bitumen may be extracted from the material by closing both valves 21 and 27 and opening valve 31 of the vacuum pipe 30.

After this treatment valve 31 is closed and valve 27 opened, so that the pressure in the impregnating chamber becomes the same as the atmospheric pressure. Subsequently the cooling jacket 15 is moved upwardly, the slide valve 14 opened and the grate 12 with the impregnated material removed from the impregnating vessel by means of the hook 14.

A further portion of the bitumen may now still be removed from the material by introducing it into a heated chamber and leaving it therein for a proper time as already described.

We claim:

1. A process for impregnating bricks and like material with thermo-plastic substances, consisting in first preheating said material and then impregnating the different sides of the preheated material to a different extent under pressure by cooling the impregnated medium in the impregnating chamber at those sides of the material where a less intensive impregnation is desired.

2. A process for impregnating bricks and like material with thermo-plastic substances consisting in first preheating said material and then impregnating the different sides of the preheated material to a different extent under pressure by cooling the impregnating medium in the impregnating chamber at those sides of the material where a less intensive impregnation is desired, submitting the material, previous to the impregnation, to a pressure higher than atmospheric pressure, and subsequently impregnating it under a further raised pressure.

3. A process for impregnating bricks and like material with thermo-plastic substances, consisting in first preheating said material and then impregnating the different sides of the preheated material to a different extent under pressure by cooling the impregnating medium in the impregnating chamber at those sides of the material where a less intensive impregnation is desired, and reducing the pressure in the impregnating chamber after the material has been impregnated.

4. A process for impregnating bricks and like material with thermo-plastic substances consisting in first preheating said material and then impregnating the different sides of the preheated material to a different extent under pressure by cooling the impregnating medium in the impregnating chamber at those sides of the material where a less intensive impregnation is desired, submitting the material, previous to the impregnation, to a pressure higher than atmospheric pressure, subsequently impregnating it under a further raised pressure, and reducing the pressure in the impregnating chamber after the material has been impregnated.

5. A process for impregnating bricks and like material with thermo-plastic substances, consisting in first preheating said material and then impregnating the different sides of the preheated material to a different extent under pressure by cooling the impregnating medium in the impregnating chamber at those sides of the material where a less intensive impregnation is desired, and bringing the material after it has been impregnated into a separate heated chamber.

6. A process for impregnating bricks and like material with thermo-plastic substances, consisting in first preheating said material and then impregnating the different sides of the preheated material to a different extent under pressure by cooling the impregnating medium in the impregnating chamber at those sides of the material where a less intensive impregnation is desired, submitting the material previous to the impregnation to a pressure higher than atmospheric pressure, subsequently impregnating it under a further raised pressure, and bringing the material, after it has been impregnated, into a separate heated chamber.

7. A process for impregnating bricks and like material with thermo-plastic substances, consisting in first preheating said material and then impregnating the different sides of the pre-heated material to a different extent under pressure by cooling the impregnating medium in the impregnating chamber at those sides of the material where a less intensive impregnation is desired, reducing the pressure in the impregnating chamber, after the material has been impregnated, and subsequently bringing the impregnated material into a separate heated chamber.

8. A process for impregnating bricks and like material with thermo-plastic substances, consisting in first preheating said material and then impregnating the different sides of the pre-heated material to a different extent under pressure by cooling the impregnating medium in the impregnating chamber at those sides of the material where a less intensive impregnation is desired, submitting the material, previous to the impregnation, to a pressure higher than atmospheric pressure, subsequently impregnating it under a further raised pressure, reducing the pressure in the impregnating chamber after the material has been impregnated, and subsequently bringing the impregnated material into a separate heated chamber.

9. A procsess for impregnating bricks and like material with thermo-plastic substances, consisting in first preheating said material and then impregnating the different sides of the pre-heated material to a different extent under pressure by cooling the impregnating medium in the impregnating chamber at those sides of the material where a less intensive impregnation is desired, bringing the material, after it has been impregnated, into a separate heated chamber, and reducing the pressure in said chamber beneath the atmospheric pressure.

10. A process for impregnating bricks and like material with thermo-plastic substances, consisting in first preheating said material and then impregnating the different sides of the pre-heated material to a different extent under pressure by cooling the impregnating medium in the impregnating chamber at those sides of the material where a less intensive impregnation is desired, submitting the material, previous to the impregnation, to a pressure higher than atmospheric pressure, subsequently impregnating it under a further raised pressure, bringing the material, after it has been impregnated, into a separate heated chamber, and reducing the pressure in said chamber beneath the atmospheric pressure.

11. A process for impregnating bricks and like material with thermo-plastic substances, consisting in first preheating said material and then impregnating the different sides of the preheated material to a different extent under pressure by cooling the impregnating medium in the impregnating chamber at those sides of the material where a less intensive impregnation is desired, reducing the pressure in the impregnating chamber after the material has been impregnated and subsequently bringing the impregnated material into a separate heated chamber, and reducing the pressure in said chamber beneath the atmospheric pressure.

12. A process for impregnating bricks and like material with thermo-plastic substances, consisting in first preheating said material and then impregnating the different sides of the preheated material to a different extent under pressure by cooling the impregnating medium in the impregnating chamber at those sides of the material where a less intensive impregnation is desired, submitting the material, previous to the impregnation, to a pressure higher than atmospheric pressure, subsequently impregnating it under a further raised pressure, reducing the pressure in the impregnating chamber after the material has been impregnated and subsequently bringing the impregnated material into a separate heated chamber, and reducing the pressure in said chamber beneath the atmospheric pressure.

In testimony whereof we affix our signatures.

ANDREAS JOHANNES MARIA STOFFELS.
HERMAN TOBIAS van der WISSEL.